United States Patent
Hiekata et al.

(10) Patent No.: US 10,399,828 B2
(45) Date of Patent: Sep. 3, 2019

(54) ELECTRICALLY DRIVEN WINCH DEVICE AND MOBILE CRANE

(71) Applicants: Kobe Steel, Ltd., Kobe-shi (JP); KOBELCO CONSTRUCTION MACHINERY CO., LTD., Hiroshima-shi (JP)

(72) Inventors: Takashi Hiekata, Kobe (JP); Koji Inoue, Kobe (JP); Hiroaki Kawai, Kobe (JP); Shintaroh Sasai, Hyogo (JP); Tetsuya Ogawa, Hyogo (JP); Toshiro Yamashita, Hyogo (JP)

(73) Assignees: Kobe Steel, Ltd., Kobe-shi (JP); KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/772,339

(22) PCT Filed: Oct. 7, 2016

(86) PCT No.: PCT/JP2016/079905
§ 371 (c)(1),
(2) Date: Apr. 30, 2018

(87) PCT Pub. No.: WO2017/077812
PCT Pub. Date: May 11, 2017

(65) Prior Publication Data
US 2018/0319635 A1 Nov. 8, 2018

(30) Foreign Application Priority Data
Nov. 2, 2015 (JP) .................. 2015-215731

(51) Int. Cl.
*B66D 1/12* (2006.01)
*B66C 23/36* (2006.01)
*H02K 21/24* (2006.01)

(52) U.S. Cl.
CPC .............. *B66C 23/36* (2013.01); *B66D 1/12* (2013.01); *H02K 21/24* (2013.01); *B66C 2700/0378* (2013.01); *B66D 2700/0141* (2013.01)

(58) Field of Classification Search
CPC ........................................... B66C 23/36
(Continued)

(56) References Cited

U.S. PATENT DOCUMENTS 5,936,375 A * 8/1999 Enoki ................ B66C 13/28
318/53
7,633,248 B1 * 12/2009 Williams ............. E21B 19/006
318/150
(Continued)

FOREIGN PATENT DOCUMENTS

EP 2 696 481 A2 2/2014
JP 2005-263420 A 9/2005
(Continued)

OTHER PUBLICATIONS

International Search Report dated Dec. 13, 2016 in PCT/JP2016/079905, filed on Oct. 7, 2016.
(Continued)

*Primary Examiner* — David Luo
(74) *Attorney, Agent, or Firm* — Oblon, McClelland, Maier & Neustadt, L.L.P.

(57) ABSTRACT

An electrically driven winch device includes a winch drum, a plurality of axial-gap electric motors, and a drive shaft. The winch drum rotates around a drum axis in order to wind or unwind a work rope. The plurality of electric motors are electric motors configured to drive the winch drum to rotate, and are each provided with a stator, and rotors which rotate around a rotation axis and are disposed at an axial distance from the stator. The drive shaft is disposed coaxially with the drum axis and serially connects the rotors of the plurality of electric motors on the rotation axis.

11 Claims, 15 Drawing Sheets

(58) Field of Classification Search
USPC .................................................... 318/261, 3
See application file for complete search history.

(56) References Cited

U.S. PATENT DOCUMENTS

| | | | | |
|---|---|---|---|---|
| 8,436,558 B2 * | 5/2013 | Holmberg | .............. | B66D 1/505 |
| | | | | 114/213 |
| 2008/0136282 A1 | 6/2008 | Okazaki et al. | | |
| 2013/0328429 A1 | 12/2013 | Enomoto et al. | | |
| 2017/0043983 A1 | 2/2017 | Hiekata et al. | | |

FOREIGN PATENT DOCUMENTS

| | | |
|---|---|---|
| JP | 2008-005655 A | 1/2008 |
| WO | WO 2006/068042 A1 | 6/2006 |
| WO | WO 2011/129705 A1 | 10/2011 |
| WO | WO 2015/163137 A1 | 10/2015 |

OTHER PUBLICATIONS

Extended European Search Report (EESR) dated Jul. 2, 2019 in corresponding European Patent Application No. 16861879.1, (5 pages).

* cited by examiner

ELECTRICALLY DRIVEN WINCH DEVICE AND MOBILE CRANE

TECHNICAL FIELD

The present invention relates to an electrically driven winch device provided with a winch drum configured to wind and unwind a work rope, and a mobile crane provided with the electrically driven winch device.

BACKGROUND ART

A mobile crane is provided with a winch device configured to wind up and down a hoisted load. A mainly used winch device is a winch device driven by a hydraulic actuator such as a hydraulic motor. However, a hydraulic actuator generally has low energy efficiency. It is therefore proposed to mount, on a crane, an electrically driven winch device in which an electric actuator having relatively high energy efficiency is used as a driving source for the electrically driven winch device. For example, motorization of a winch device is progressing for a tower crane configured to perform crane work in a state fixed to a floor of a building under construction.

Patent Literature 1 discloses a climbing crane which is an example of a tower crane. This climbing crane is provided with an electrically driven winch device having a winch drum, and two electric motors configured to drive the winch drum to rotate. In this electrically driven winch device, two electric motors are disposed separately on both axial sides of the winch drum and torque from respective electric motors is input into the winch drum from the both sides, in order to prevent generation of local torsion at an input shaft of the winch drum or at the winch drum itself.

The electrically driven winch device of Patent Literature 1 has an advantage that large hoisting capacity can be secured, since the winch drum is rotated with torque output from two electric motors. However, the axial dimension of an electrically driven winch device increases when employing a structure in which two electric motors are disposed on both axial sides of the winch drum. Accordingly, it becomes impossible to employ an electrically driven winch device having such a structure in a case where there is restriction regarding an installation space. Moreover, when such an electrically driven winch device is mounted on a mobile crane, a vehicle width thereof becomes large, and it may possibly become necessary to employ disassembling transportation in transporting the mobile crane using a public road, according to a legal request on vehicle width limitation.

CITATION LIST

Patent Literature

Patent Literature 1: Japanese Patent Application Laid-Open No. 2005-263420

SUMMARY OF INVENTION

An object of the present invention is to provide an electrically driven winch device and a mobile crane, which can suppress an axial width of the winch drum while securing large hoisting capacity.

An electrically driven winch device according to an aspect of the present invention includes: a winch drum rotating around a drum axis in order to wind or unwind a work rope; a plurality of axial-gap electric motors which are electric motors configured to drive the winch drum to rotate and are each provided with a stator, and a rotor that rotates around a rotation axis and is disposed at an axial distance from the stator; and a drive shaft being disposed coaxially with the drum axis and serially connects the rotors of the plurality of electric motors on the rotation axis.

A mobile crane according to another aspect of the present invention includes: an operation unit for hoisting work; and the above electrically driven winch device, in which the work rope is a rope connected with the operation unit.

The objects, features and advantages of the present invention will become clearer with the following detailed description and the appended drawings.

DESCRIPTION OF EMBODIMENTS

Figure 1:
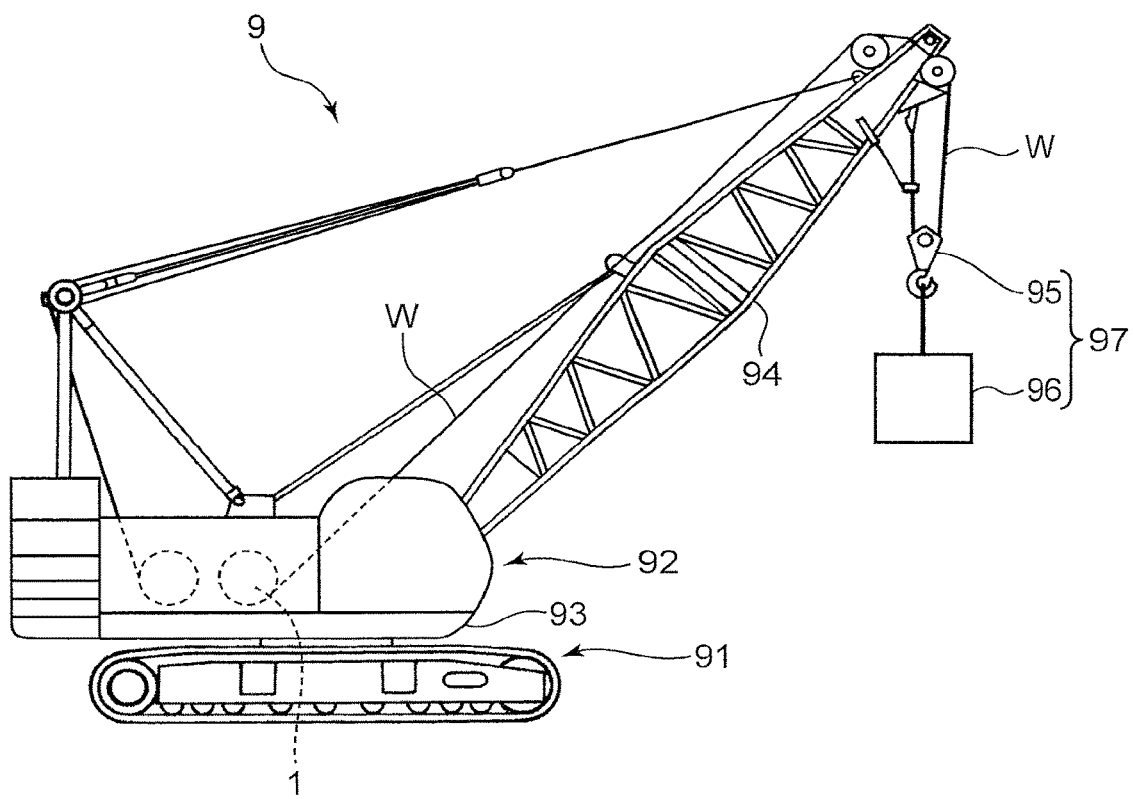
FIG. 1 is a schematic side view of a mobile crane having an electrically driven winch device according to an embodiment of the present invention mounted thereon.

The following description will explain embodiments of the present invention in detail with reference to the drawings. FIG. 1 is a schematic side view of a mobile crane 9 having an electrically driven winch device 1 according to an embodiment of the present invention mounted thereon. The mobile crane 9 is a crawler crane and is provided with a self-travelling lower travelling body 91 of crawler type, and an upper slewing body 92 mounted on the lower travelling body 91.

The upper slewing body 92 is provided with a slewing frame 93 which is mounted on the lower travelling body 91 so as to be able to slew around a vertical axis, a boom 94 attached to a front part of the slewing frame 93 so as to be able to rise, and a hooking device 95 which is hung from a tip of the boom 94 via a wire rope W (a work rope) which is a hoisting rope. The hooking device 95 functions as an operation unit for hoisting work. FIG. 1 illustrates a state where a hoisted load 96 is hung by the hooking device 95 connected with the wire rope W. The hooking device 95 and the hoisted load 96 hung therefrom are an object 97 to be wound up or down by the electrically driven winch device 1.

The electrically driven winch device 1 is mounted on the upper slewing body 92. A position where the electrically driven winch device 1 is disposed is behind an attachment site of the boom 94 at the slewing frame 93. The electrically driven winch device 1 is a winch device for winding up, which winds or unwinds the wire rope W connected with the hooking device 95 so as to cause the hooking device 95 to perform elevating operation for hoisting work. The electrically driven winch device 1 of this embodiment is characterized in that a plurality of axial-gap electric motors are used as a driving source for the elevating operation.

[Structure of Electrically Driven Winch Device]

Figure 2:
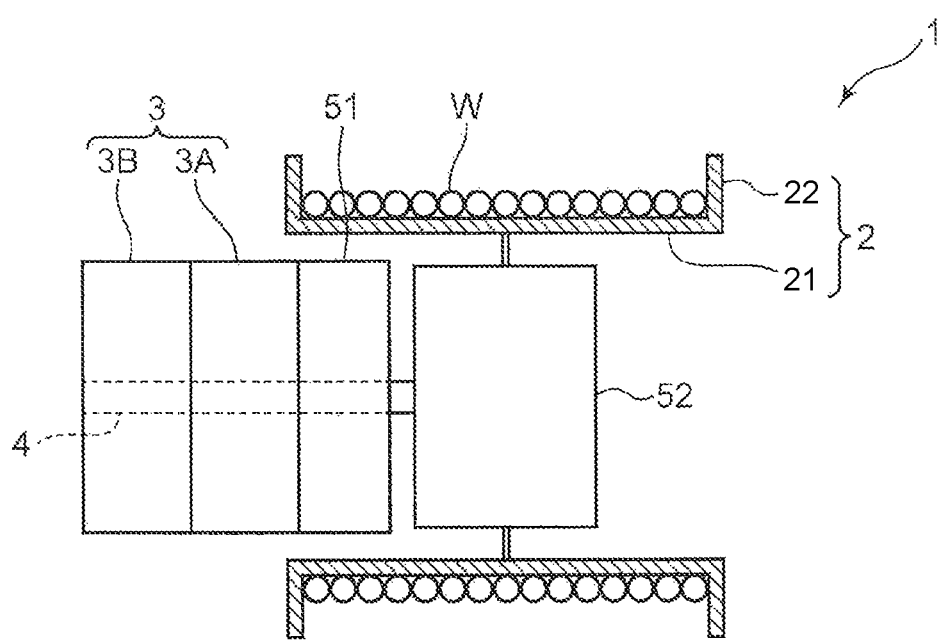
FIG. 2 is a schematic view of the above electrically driven winch device.
Figure 3:
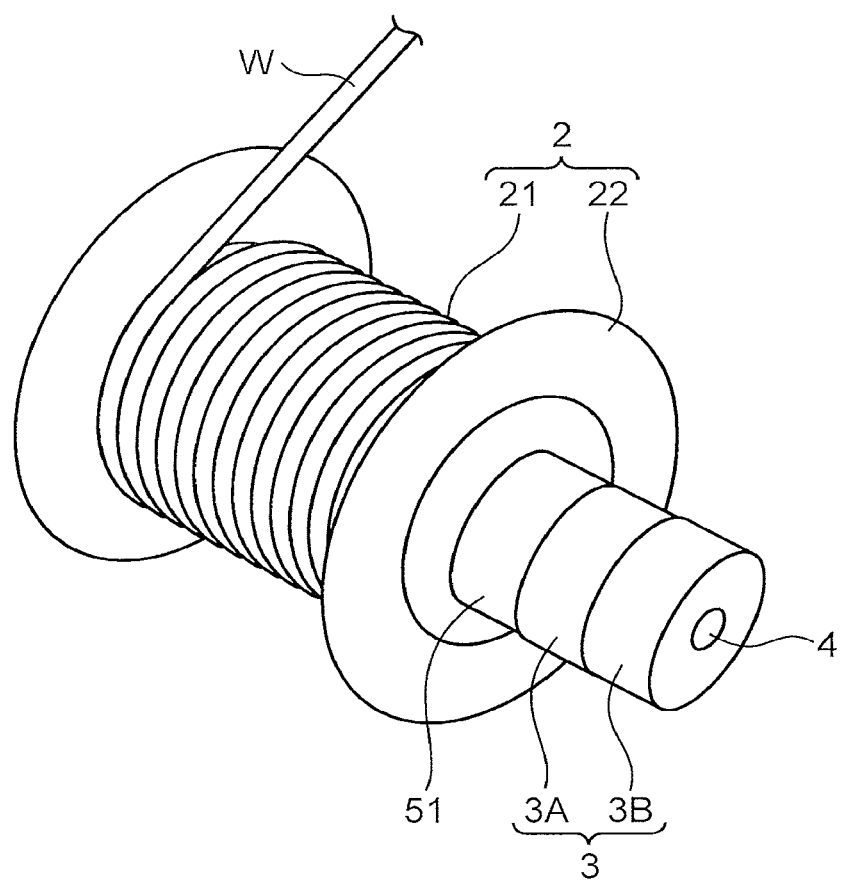
FIG. 3 is a schematic perspective view of the above electrically driven winch device.

FIG. 2 is a plan view illustrating a schematic structure of the electrically driven winch device 1, and FIG. 3 is a perspective view thereof. The electrically driven winch device 1 is provided with a winch drum 2, a driving source 3 having a first electric motor 3A and a second electric motor 3B (a plurality of electric motors) of axial-gap type, a drive shaft 4 common to the electric motors 3A, 3B, a brake 51 to be attached to the drive shaft 4, and a reduction gear 52 to be interposed between the drive shaft 4 and the winch drum 2.

Figure 4:
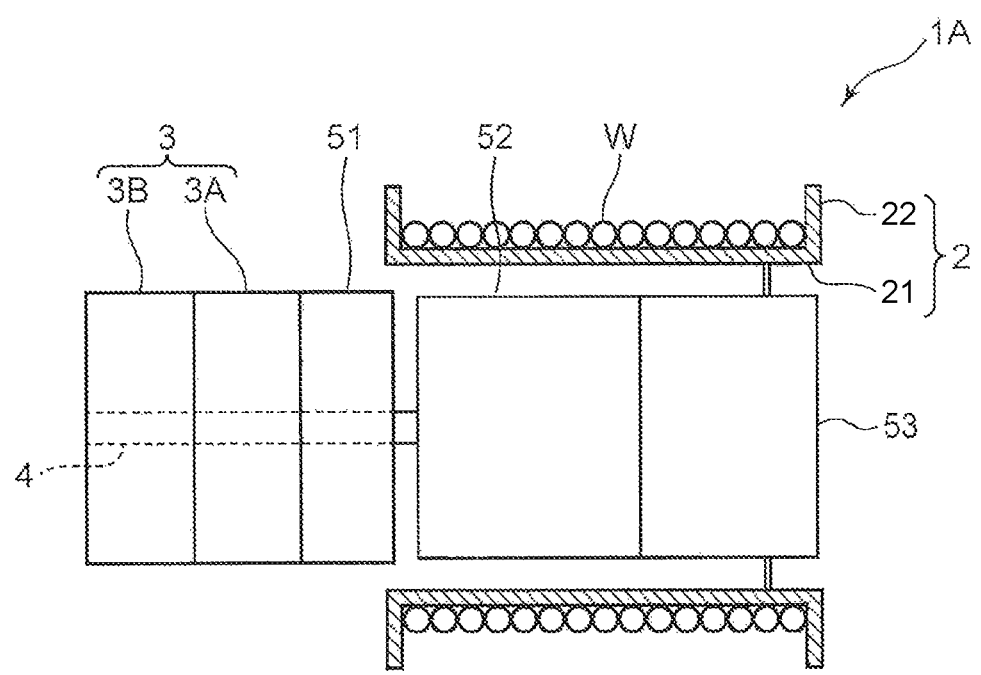
FIG. 4 is a schematic view of an electrically driven winch device according to another embodiment.

FIG. 4 is a plan view illustrating a schematic structure of an electrically driven winch device 1A according to another embodiment. The electrically driven winch device 1A is an embodiment which can realize so-called free fall operation and is further provided with a clutch 53 in addition to the structure illustrated in FIG. 2. The clutch 53 is interposed between the drive shaft 4 and the winch drum 2 as with the reduction gear 52. The following description will explain each structure in detail. The winch drum 2 is provided with a cylindrical drum part 21 on which a wire rope W is to be wound, and a flange part 22 disposed on both ends of the drum part 21. The winch drum 2 rotates around a drum axis (denoted as AX2 in FIG. 6) which is the cylinder center of the drum part 21, in order to wind or unwind the wire rope W. It is to be noted that the winch drum 2 and the wire rope W are represented as a cross section along the drum axis direction in FIGS. 2 and 4, in order to show the internal structure of the winch drum 2.

An unillustrated shaft part along the drum axis is projected from both ends of the winch drum 2. A pair of shaft support parts (unillustrated) for rotatably supporting the shaft part of the winch drum 2 are provided on the slewing frame 93. The pair of shaft support parts are disposed at a distance from each other in a width direction of the slewing frame 93 or, in other words, in a vehicle width direction of the mobile crane 9. That is, the winch drum 2 is mounted on the slewing frame 93 in a manner such that the vehicle width direction and the drum axis coincide with each other.

The wire rope W is drawn out from the drum part 21, extracted through a tip of the boom 94, and hung down from the tip of the boom 94 so that the hooking device 95 is hung therefrom. The winch drum 2 rotates in a winding-up direction which is one rotation direction around the drum axis, so as to wind the wire rope W around the drum part 21 and therefore wind up the hooking device 95 (the object 97). Moreover, the winch drum 2 rotates in a winding-down direction which is a rotation direction opposite to the winding-up direction, so as to unwind the wire rope W and therefore wind down the object 97.

The driving source 3 is configured to drive the winch drum 2 to rotate and includes the first electric motor 3A and the second electric motor 3B which are a plurality of axial-gap electric motors serially connected with each other. Although an example in which two electric motors 3A, 3B are connected with each other are illustrated here, the driving source 3 may be constructed by connecting approximately three to ten axial-gap electric motors with each other. The first electric motor 3A and the second electric motor 3B operate when being supplied with electric power, and output torque for rotating the winch drum 2 in a winding-up direction at the time of winding up the object 97. Both of the first and second electric motors 3A, 3B are disposed on one side in the drum axis direction of the winch drum 2 as illustrated in FIGS. 2 and 4.

[Structure of Axial-Gap Electric Motor]

Figure 5:
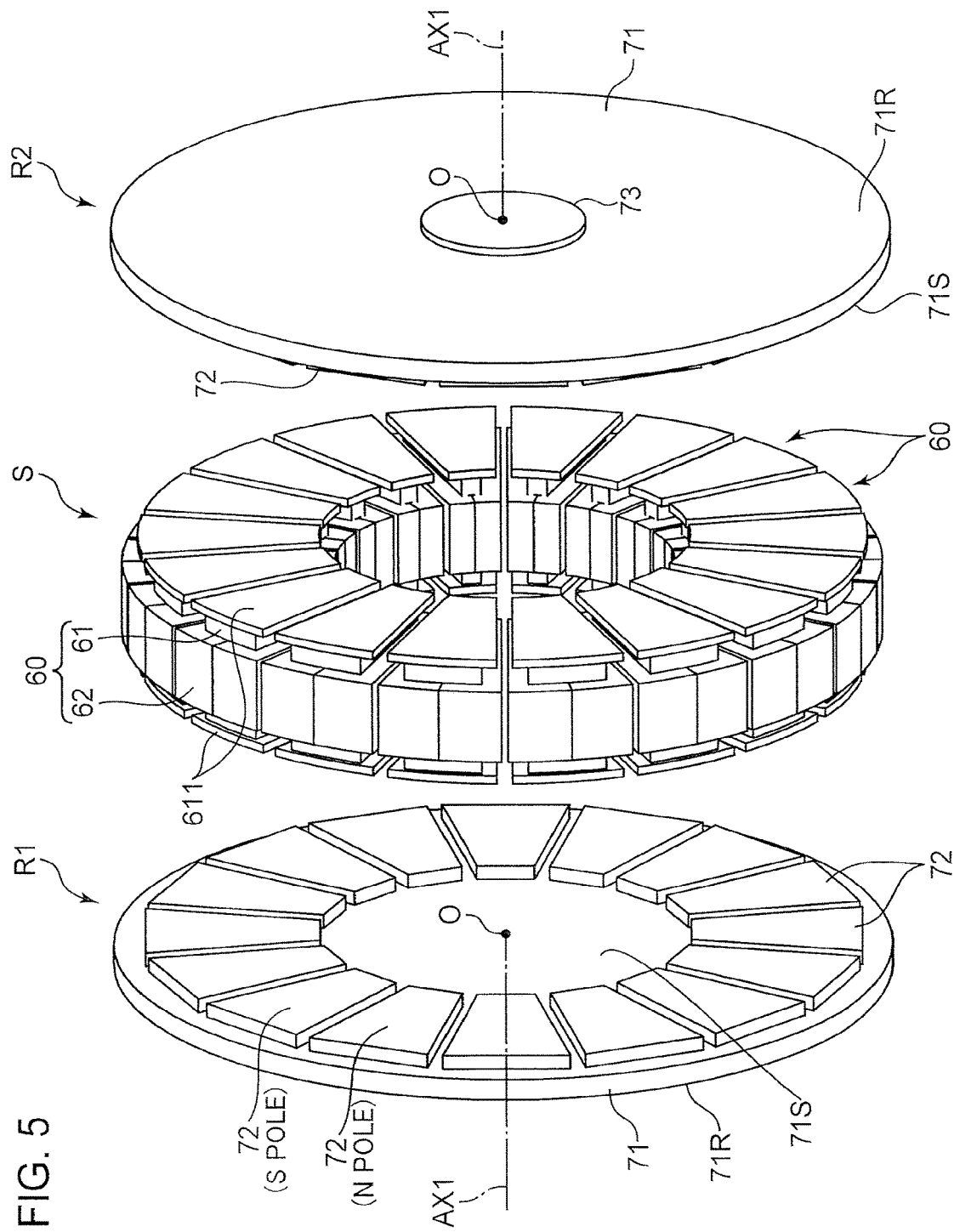
FIG. 5 is an exploded perspective view of an axial-gap electric motor.

FIG. 5 is an exploded perspective view illustrating a structure of an axial-gap electric motor employed as the first and second electric motors 3A, 3B and illustrates an axial-gap DC brushless motor here. An axial-gap electric motor includes a disk-shaped stator 5, and two disk-shaped rotors R1, R2 configured to rotate around a rotation center axis AX1 (rotation axis). The stator S and the rotors R1, R2 are disposed so as to align in the axial direction of the rotation center axis AX1. Each of the rotors R1, R2 is disposed at an axial distance from the stator S in an assembled state. The distance is a so-called axial gap, and a length thereof is set to approximately 1 mm to several millimeters.

As described above, this embodiment illustrates an electric motor of double rotor type in which one rotor R1 faces the left disk surface in the figure of the stator S and the other rotor R2 faces the right disk surface of the stator S so that one stator S is sandwiched between a pair of rotors R1, R2. It is to be understood that an axial-gap electric motor may be of single rotor type in which one rotor is disposed to face one stator in the axial direction. Here, a double rotor type is preferable from the viewpoint of obtaining larger torque per one electric motor.

The stator S includes a plurality of electromagnet units 60 (slots) arranged in a circumferential direction (the rotation direction of the rotors R1, R2). Each electromagnet unit 60 is provided with a fan-shaped magnetic core 61, and an exciting coil 62 mounted on the magnetic core 61. A plurality of magnetic cores 61 are supported by an unillustrated core support member and are disposed evenly in an annular shape around the rotation center axis AX1.

Each magnetic core 61 is preferably a dust core. A dust core is a core formed by strongly pressing iron powder coated with electrically insulating coat. In addition to the dust core, a laminated core constituted of a laminate of a plurality of electromagnetic steel sheets can be used from the viewpoint of suppressing eddy current. A dust core has higher airtightness and higher degree of freedom in molding than the laminated core and therefore is more preferable as the magnetic core 61. In this embodiment, each magnetic core 61 has a bobbin shape in which a flange part 611 is formed on both end surfaces of the axial direction thereof.

Regarding the exciting coil 62, insulated wire is wound by a required number of turns around a winding core of the bobbin-shaped magnetic core 61. Supply of direct current to the exciting coil 62 generates a magnetic flux penetrating the magnetic core 61 in a direction parallel to the rotation center axis AX1. Moreover, the direction of the magnetic flux can be inverted by inverting the direction of supply of direct current to the exciting coil 62. Switching of the current supply direction and current supply to each exciting coil 62 is controlled by an unillustrated driver circuit, so that a line of magnetic force which causes the rotors R1, R2 to rotate around the rotation center axis AX1, is formed.

The rotors R1, R2 are each provided with a disk-shaped base member 71, and a plurality of permanent magnets 72 (magnetic poles) fixed to the base member 71. The base member 71 is provided with an inner surface 71S facing the stator S, and an outer surface 71R on a side opposite to the inner surface 71S. Both of the inner surface 71S and the outer surface 71R are circular surfaces perpendicular to the rotation center axis AX1. Each permanent magnet 72 is made of neodymium or the like and is a platelike magnet having a fan shape in axial view. The plurality of permanent magnets 72 are arranged annually in the vicinity of an outer peripheral edge of the inner surface 71S so that S poles and N poles align alternately in the circumferential direction around the center point O (a point to cross the rotation center axis AX1) of the inner surface 71S. It is to be noted that a permanent magnet 72 forming one pole may have a form divided into a plurality of magnet pieces in order to reduce Joule loss due to eddy current.

The disk-shaped base member 71 is a member formed of magnetic substance such as steel material and holds both of a support function for the above-described permanent magnets 72 and a function as a back yoke for the permanent magnets 72. The rear surface of a permanent magnet 72 which has a surface that faces the stator S and is magnetized to an S pole, becomes an N pole. A permanent magnet 72 which is adjacent to the above permanent magnet 72 has a front surface being an N pole and a rear surface being an S pole. The base member 71 supports the rear surface side of these permanent magnets 72 and also serves to form a magnetic path between the S pole and the N pole on the rear surface side. The permanent magnets 72 are fixed to the inner surface 71S of the base member 71 using adhesive such as epoxy resin adhesive, for example. The permanent magnets 72 may also be fixed to the inner surface 71S using a fixture such as a flat countersunk head screw instead of adhesive.

On the outer surface 71R of each of the rotors R1, R2, a boss part 73 is projected outward in the axial direction. Each boss part 73 is a cylindrical protrusion disposed in the vicinity of the radial center of the outer surface 71R and is coaxial with the center point O (a point where the rotation center axis AX1 crosses the outer surface 71R) of each of the rotors R1, R2. Each boss part 73 is a projection for attaching a shaft member of a part of a drive shaft 4 which will be described later, in a spigot joint form in order to serially connect the first and second electric motors 3A, 3B in the axial direction.

[Drive Shaft]

Figure 6:
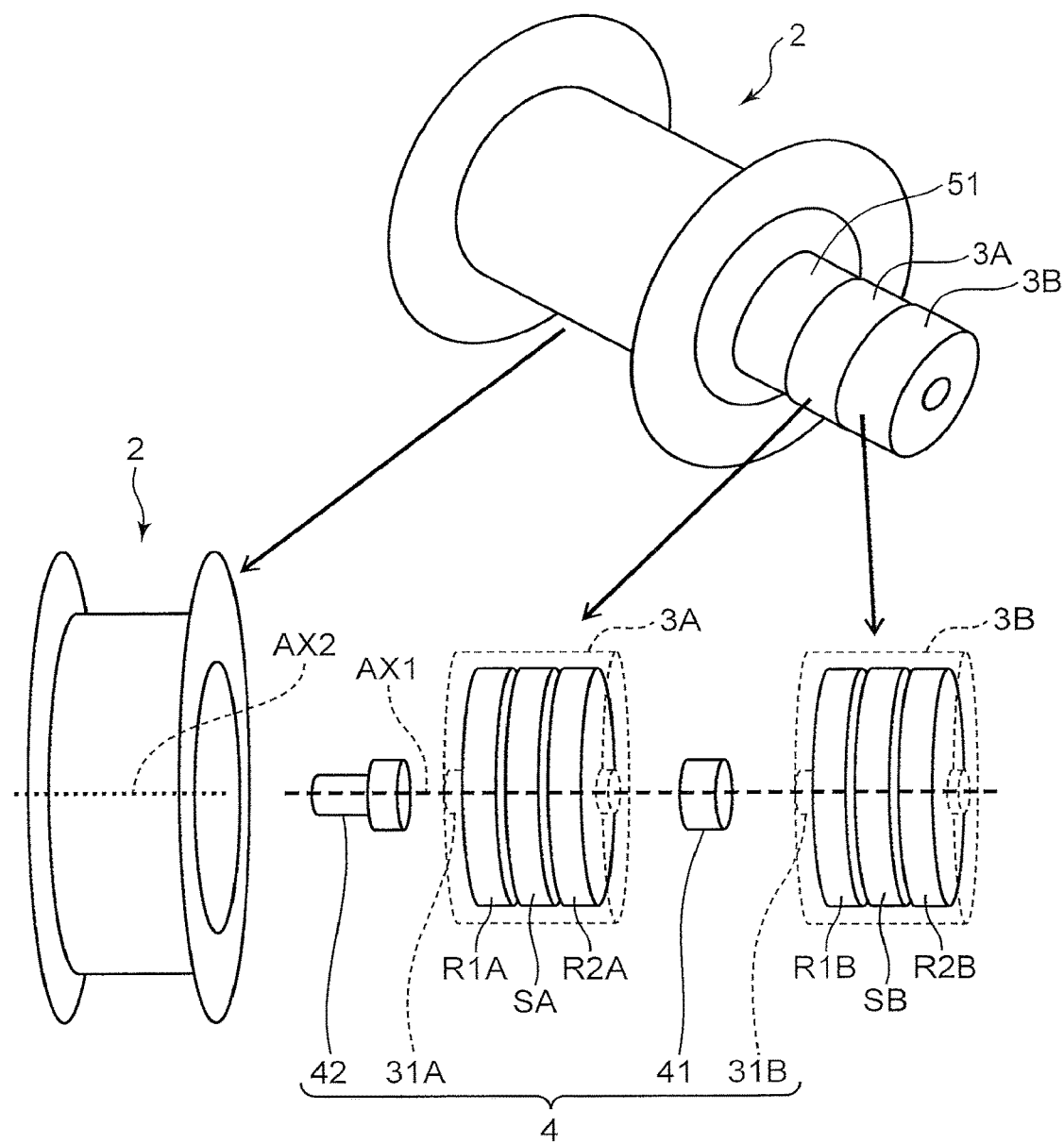
FIG. 6 is a schematic exploded perspective view of the above electrically driven winch device.

The drive shaft 4 is an output shaft of the driving source 3, and the winch drum 2 rotates when the drive shaft 4 rotates. FIG. 6 is a schematic perspective view of the electrically driven winch device 1 and an exploded perspective view thereof, and is a figure illustrating a structure example of the drive shaft 4. The drive shaft 4 is a shaft which serially connects the rotors of the first and second electric motors 3A, 3B with each other on the rotation center axis AX1. This drive shaft 4 is disposed coaxially with the drum axis AX2 of the winch drum 2 (the rotation center axis of the winch drum 2).

The drive shaft 4 is composed of a rotation shaft 31A of the first electric motor 3A, a rotation shaft 31B of the second electric motor 3B, a connection shaft part 41 configured to connect the rotation shaft 31A and the rotation shaft 31B with each other, and an output shaft part 42 connected with a drive transmission system of the winch drum 2, which are serially disposed on the rotation center axis AX1. The rotation shaft 31A is a shaft which penetrates the stator SA and connects the two rotors R1A, R2A of the first electric motor 3A with each other. The rotation shaft 31B is a shaft which penetrates the stator SB and connects the two rotors R1B, R2B of the second electric motor 3B with each other. A shaft end of each of the rotation shafts 31A, 31B is the boss part 73 illustrated in FIG. 5.

The connection shaft part 41 connects both rotation shafts 31A, 31B with each other in a spigot joint form by using boss parts 73 respectively provided at one rotor R2A of the first electric motor 3A and one rotor R1B facing the rotor R2A, of the second electric motor 3B. Regarding the output shaft part 42, the base side is connected in a spigot joint form with a boss part 73 provided at the other rotor R1A of the first electric motor 3A, and the tip side is connected with the drive transmission system of the winch drum 2, that is, with the brake 51, the reduction gear 52, and the clutch 53. It is to be noted that an encoder configured to measure the rotation speed, for example, is attached to a boss part 73 provided at the other rotor R2B of the second electric motor 3B.

[Another Structure Member of Electrically Driven Winch Device]

Referring back to FIG. 2, the brake 51 is to brake rotation of the winch drum 2 which is connected with the drive shaft 4, by braking the drive shaft 4. An electromagnetic brake, a dry or wet mechanical brake, or the like can be used as the brake 51, for example. The brake 51 is provided at a position which is between the driving source 3 and the reduction gear 52 and is around the output shaft part 42 (FIG. 6) of the drive shaft 4, and brakes the output shaft part 42.

The reduction gear 52 is disposed in the drum part 21 of the winch drum 2. The input side of the reduction gear 52 is connected with the drive shaft 4 (output shaft part 42), and the output side of the reduction gear 52 is connected with the drum part 21. The reduction gear 52 causes the winch drum 2 to rotate at a rotation speed which is obtained by speed reduction by a predetermined reduction ratio to rotation speed of the drive shaft 4. Moreover, the reduction gear 52 increases torque of the drive shaft 4 input from the drive shaft 4, and transmits the obtained torque to the winch drum 2. It is to be noted that the driving source 3 may be disposed between the brake 51 and the reduction gear 52 instead of the disposition in FIG. 2.

The clutch 53 used in the embodiment illustrated in FIG. 4 switches over between a connected state where torque is transmitted between the drive shaft 4 and the winch drum 2 and a disconnected state where transmission of the torque is broken, in order to realize free fall operation. A wet clutch can be used as the clutch 53, for example. The clutch 53 is disposed between the reduction gear 52 and the winch drum 2 in the drive transmission path.

Although unillustrated, the clutch 53 is provided with one clutch plate configured to rotate uniformly with an unillustrated output shaft of the reduction gear 52, the other clutch plate configured to rotate uniformly with the winch drum 2, and a switching device for switching over between a connected state where the clutch plates are connected with each other and a disconnected state where the clutch plates are separated from each other. With the electrically driven winch device 1A in FIG. 4 provided with the clutch 53, it is possible to separate the winch drum 2 from the reduction gear 52 and the drive shaft 4 connected with the reduction gear 52 and allow the winch drum 2 to freely rotate, by switching the clutch 53 from the connected state to the disconnected state. As a result, it is possible to carry out free fall of the hooking device 95 (see FIG. 1).

[Description of Control Structure]

Figure 7:
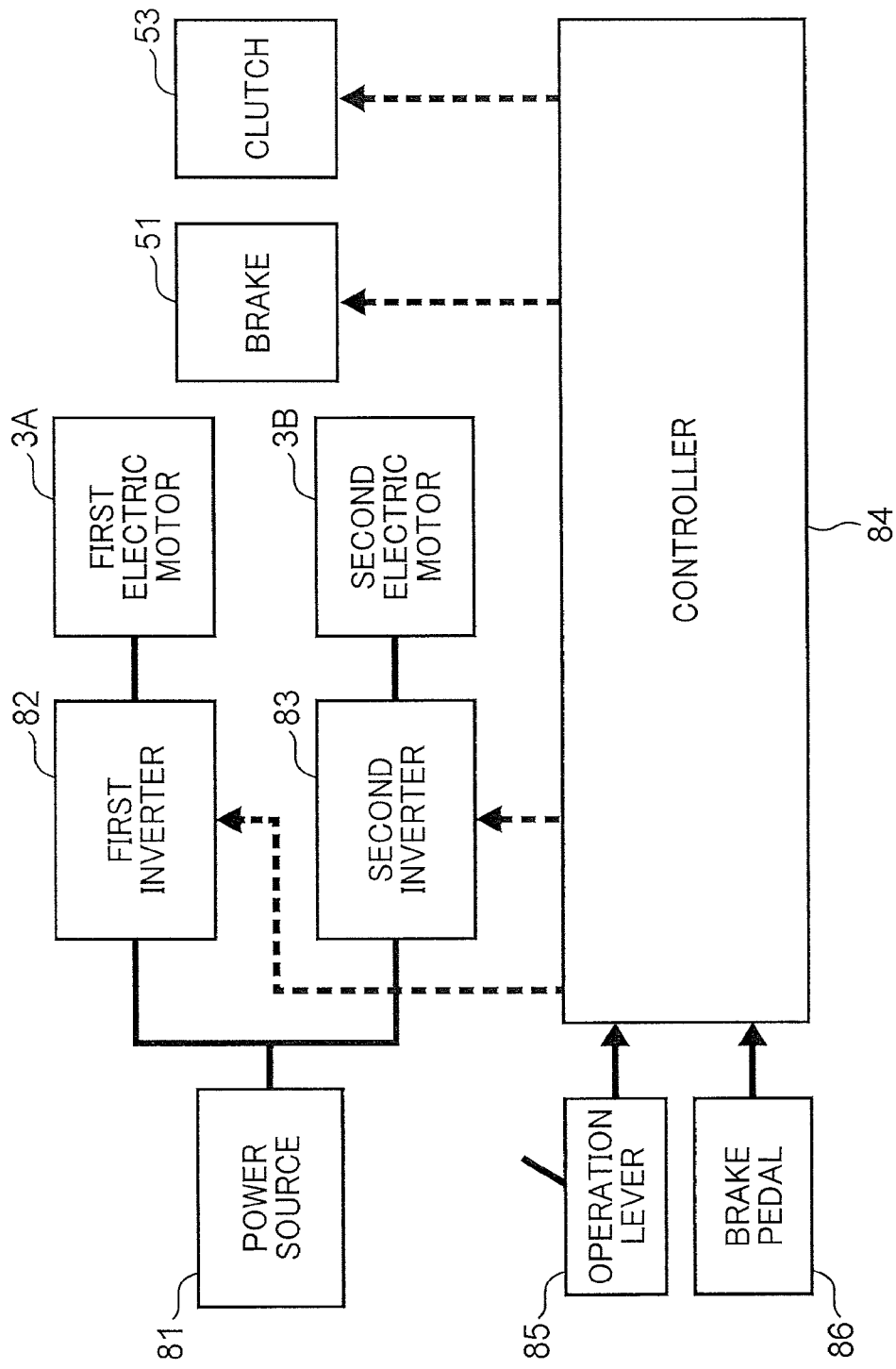
FIG. 7 is a block diagram illustrating a control structure of the above electrically driven winch device.

FIG. 7 is a block diagram illustrating the control structure of the electrically driven winch device 1A illustrated in FIG. 4. On the mobile crane 9, a power source 81 illustrated in FIG. 7 and a control system are mounted in order to control the first and second electric motors 3A, 3B, the brake 51, and the clutch 53. This control system has a first inverter 82, a second inverter 83, a winch operation lever 85, a brake pedal 86, and a controller 84.

The power source 81 is a DC battery mounted on the mobile crane 9. The first inverter 82 inverts direct voltage generated at the power source 81, into required alternating voltage and supplies the alternating voltage to the first electric motor 3A, and also controls current (motor current) to be supplied to the first electric motor 3A. The second inverter 82 similarly inverts the direct voltage into required alternating voltage and supplies the alternating voltage to the second electric motor 3B, and also controls supplied current.

The winch operation lever 85 is used by the operator for operating the winch drum 2 to rotate in a winding-up direction or a winding-down direction. An instruction signal indicative of the operation accepted through the winch operation lever 85 is output to the controller 84. The brake pedal 86 is used by the operator for operating the brake 51. An instruction signal indicative of the operation accepted through the brake pedal 86 is output to the controller 84.

The controller 84 performs synchronous control to operation of the first inverter 82 and the second inverter 83 so that the first electric motor 3A and the second electric motor 3B are driven in accordance with an instruction signal given from the winch operation lever 85. In other words, the controller 84 performs synchronous control to driving of the first and second electric motors 3A, 3B so that the winch drum 2 rotates in a winding-up direction or a winding-down direction in accordance with the operation to the winch operation lever 85.

Moreover, the controller 84 controls the brake 51 so as to apply braking indicated by an instruction signal in accordance with the instruction signal given from the brake pedal 86. Furthermore, the controller 84 controls the clutch 53 to switch over between the connected state and the disconnected state. Specifically, the controller 84 sends a control signal to the switching device of the clutch 53 and controls the switching device to put the clutch plates into the connected state or the disconnected state.

[Regarding Effects]

According to the above-described electrically driven winch devices 1, 1A, the first electric motor 3A and the second electric motor 3B of axial-gap type are used as the driving source 3 of the winch drum 2. These first and second electric motors 3A, 3B are serially connected by a common drive shaft 4 and are also assembled in a manner such that the drive shaft 4 is positioned coaxially with the drum axis AX2. In other words, two electric motors 3A, 3B are disposed so as to align laterally on one side surface of the winch drum 2.

An axial-gap electric motor has a structure in which a disk-shaped stator and rotors are arranged in the axial direction, and therefore can achieve thinning in the axial direction in comparison with a radial-gap electric motor. It is therefore possible to suppress a size in the direction of the drum axis AX2 even when employing a structure that a plurality of electric motors 3A, 3B are disposed on a side of the winch drum 2. Moreover, the axial-gap electric motor can increase an airgap area between the electromagnet units 60 of the stator S and the permanent magnets 72 of the rotors R1, R2, and therefore has an advantage that high torque is obtained. Since the first and second electric motors 3A, 3B which can generate such high torque, are serially connected with each other by a common drive shaft 4, it is possible to obtain large synthesis torque by performing synchronous driving to these electric motors 3A, 3B. Accordingly, it is possible with the electrically driven winch devices 1, 1A to secure large hoisting capacity.

Furthermore, by mounting one of the above-described electrically driven winch devices 1, 1A on the mobile crane 9, it is possible to solve the problem of vehicle width limitation while securing hoisting capacity proper for crane operation. In other words, an electric motor to be a driving source for the mobile crane 9 is often required to provide high torque with low-speed rotation. This embodiment in which the first and second axial-gap electric motors 3A, 3B are superimposed is proper for such operation of low speed and high torque. When the mobile crane 9 runs on a public road, the mobile crane itself is required to satisfy vehicle width limitation defined by law. In this embodiment, the first and second electric motors 3A, 3B are disposed only on one side of the winch drum 2, and the first and second electric motors 3A, 3B which are electric motors that are thin in the axial direction, can achieve compactification of the driving source 3 and can correspond to the vehicle width limitation.

Moreover, it can be said that it is easy to connect a plurality of axial-gap electric motors with each other in the direction of the rotation center axis AX1. Although this embodiment illustrates an example in which two electric motors 3A, 3B are serially connected with each other, a required number of axial-gap electric motors can be connected with each other along the rotation center axis AX1 by using the connection shaft part 41 illustrated in FIG. 6. Accordingly, it is possible to set the number of electric motors to be connected serially in accordance with hoisting capacity required for the mobile crane 9. This means that it is possible to eliminate the necessity of designing an electric motor for each of various types of a mobile crane having different hoisting capacity and to realize required hoisting capacity by adjusting the number of axial-gap electric motors. Furthermore, since a plurality of electric motors are provided, there is an advantage that it is easy to cope in case of breakdown of one electric motor by, for example, causing another electric motor to perform minimum winch operation.

In addition, the controller 84 can independently control the first and second inverters 82, 83 configured to supply operation current to the first and second electric motors 3A, 3B as illustrated in FIG. 7. As typical control, it is possible to cause the first and second electric motors 3A, 3B having the same capacity, to output the same torque and perform synchronous operation by giving the same driving current at the same timing and to execute control for obtaining required synthetic torque output. Alternatively, it is possible to improve an energy saving property not by outputting the same torque from the first and second electric motors 3A, 3B but by obtaining synthesis torque from combination of the most efficient torque output of both electric motors in a case of obtaining synthetic torque output. It also becomes possible to change an electric motor used preferentially for each work on the basis of history of load or frequency of use of the respective electric motors 3A, 3B. This can improve a durability or reliability of the electrically driven winch device in comparison with a case where one electric motor is used.

[Embodiment Provided with Cogging Countermeasure]

In an electric motor, cogging (cogging torque) occurs depending on the number of slots of the stator and the number of magnetic poles of the rotors. The times of cogging to occur during one rotation of a rotor is the least common multiple of the number of slots of the stator (the number of electromagnet units 60 illustrated in FIG. 5) and the number of magnetic poles of the stators (the number of the permanent magnets 72). In a case of the number of slots=9 and the number of magnetic poles=6, for example, cogging occurs eighteen times per one rotation of a stator, that is, cogging occurs every time a rotor rotates by 20°. This leads to generation of pulsation of output torque of the drive shaft. An axial-gap electric motor tends to generate a cogging problem remarkably, though high torque can be obtained.

Especially, in a case where a plurality of axial-gap electric motors 3A, 3B are serially connected with each other as in this embodiment, cogging of the respective electric motors 3A, 3B is superimposed and transmitted to the drive shaft 4. This may possibly influence the operability in a case where the winch drum 2 is rotated at low speed, a case where inching is performed, or the like.

The following description will illustrate an embodiment for resolving such a cogging problem. Illustrated here is cancelling means configured to cancel cogging which occurs in one electric motor of a plurality of electric motors, and cogging which occurs in another electric motor. As a specific example of cancelling means, a technique that:

(Specific Example 1) the positions where magnetic poles (permanent magnets 72) of rotors are fixed are made different between one electric motor and another electric motor; or (Specific Example 2) the positions where slots (electromagnet units 60) of a stator are disposed are made different between one electric motor and another electric motor is illustrated. By providing such cancelling means, pulsation of output torque of the respective electric motors based on cogging is cancelled.

<Case of Two Electric Motors>

Figure 8:
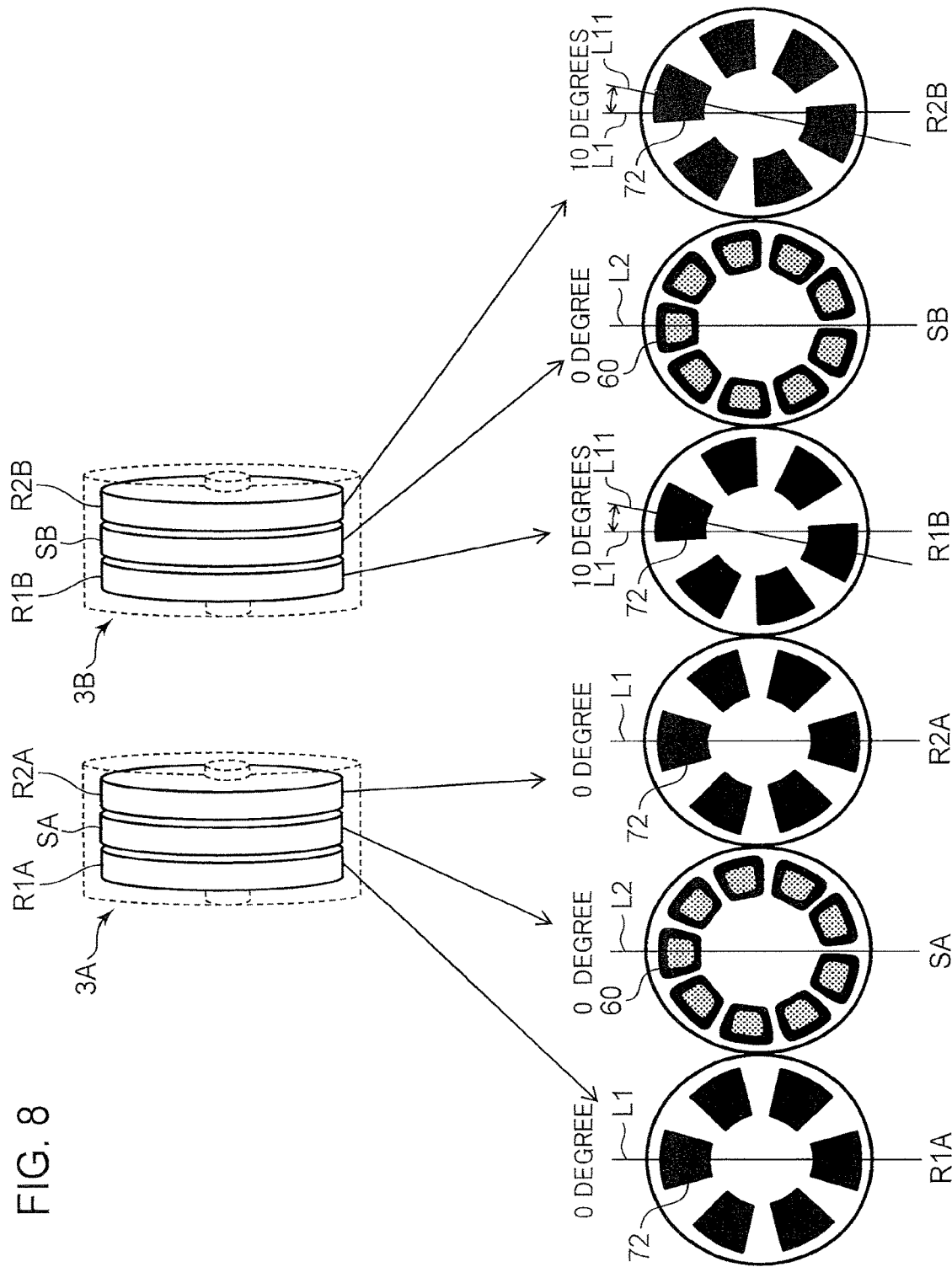
FIG. 8 is a figure illustrating an example of disposition of slots of a stator and magnetic poles of rotors of a case where two electric motors are connected with each other.

FIG. 8 is a figure illustrating an example of the above "Specific Example 1", which is an example of disposition of slots of stators and magnetic poles of rotors of a case where two electric motors 3A, 3B are connected with each other. Both of the first electric motor 3A and the second electric motor 3B are axial-gap electric motors of double rotor type, in which the first electric motor 3A is provided with a stator SA and two rotors R1A, R2A, and the second electric motor 3B is provided with a stator SB and two rotors R1B, R2B. The number of magnetic poles of the rotors R1A, R2A and the rotors R1B, R2B is six, and the number of slots of the stators SA, SB is nine. Accordingly, the cycle of occurrence of cogging is every rotation angle of a rotor=20° as illustrated in the above description.

The rotors R1A, R2A of the first electric motor 3A are fixed to the drive shaft 4 (FIG. 2) at a reference rotation angle at which magnetic poles (permanent magnets 72) are positioned at a predetermined reference position. The reference rotation angle is an angle of the rotation angle of the rotors R1A, R2A=0°, and the circumferential center of one permanent magnet 72 (a permanent magnet 72 positioned on the upmost side in FIG. 8) to be a reference at this time is positioned on a line L1 of a rotation angle=0°. The line L1 is a line passing through the center point O (FIG. 5) of the rotors R1A, R2A. The slots (electromagnet units 60) of the stator SA are attached in accordance with the reference rotation angle. In other words, the slots are fixed to a casing of the first electric motor 3A in a manner such that the circumferential center of one electromagnet unit 60 to be a reference is positioned on a line L2 facing the line L1 of a rotation angle=0°.

On the contrary, the rotors R1B, R2B of the second electric motor 3B are fixed to the drive shaft 4 in a state where the permanent magnets 72 are positioned at positions shifted in the rotation direction with respect to the reference rotation angle so that cogging which occurs in the second electric motor 3B, cancels cogging which occurs in the first electric motor 3A. Specifically, the circumferential center of one permanent magnet 72 to be a reference is positioned on a line L11 shifted by a rotation angle=10° in the rotation direction of the rotors R1B, R2B with respect to the line L1. This shift rotation angle=10° is a rotation angle obtained by dividing (20°/2) the cogging occurrence cycle (a rotation angle=20°) by the number of electric motors (two). On the other hand, the stator SB is fixed to a casing of the second electric motor 3B in a manner such that the circumferential center of one electromagnet unit 60 to be a reference is positioned on the line L2 as with the stator SA.

Figure 9:
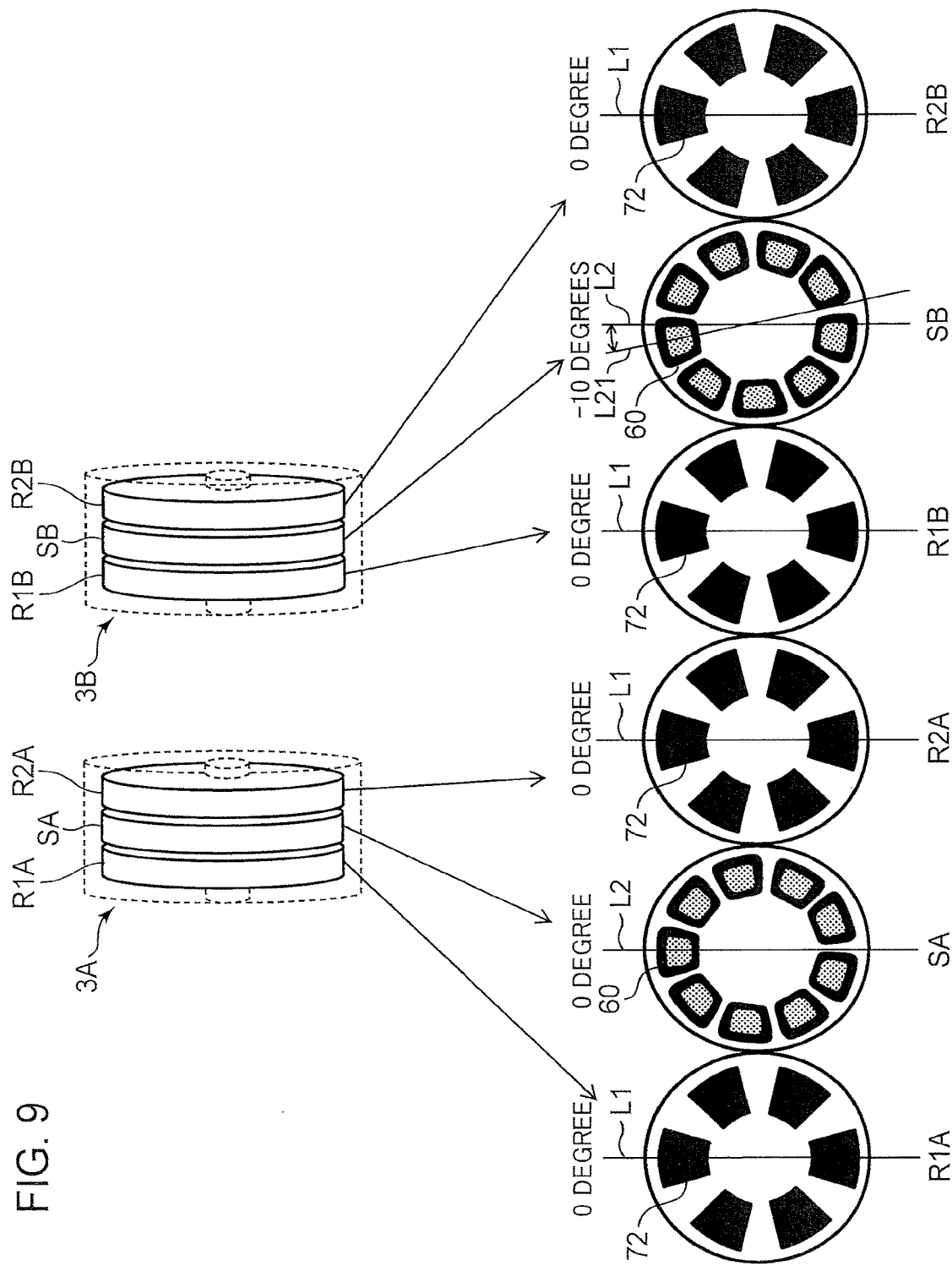
FIG. 9 is a figure illustrating another example of disposition of slots and magnetic poles of a case where the two electric motors are connected with each other.

FIG. 9 is a figure illustrating an example of the above "Specific Example 2", which is an example of disposition of slots of stators and magnetic poles of rotors of a case where two electric motors 3A, 3B are connected with each other. In this example, regarding the stator SA of the first electric motor 3A, the circumferential center of one electromagnet unit 60 to be a reference is positioned (at a reference slot position) on the above-described line L2. In this state, the stator SA is disposed in the casing of the first electric motor 3A.

On the contrary, regarding the stator SB of the second electric motor 3B, the circumferential center of one electromagnet unit 60 to be a reference is positioned on a line L21 shifted by a rotation angle=−10° in the rotation direction of the rotors R1B, R2B with respect to the line L2. In such a shifted state, the stator SB is disposed in the casing of the second electric motor 3B. All of the rotors R1A, R2A of the first electric motor 3A and the rotors R1B, R2B of the second electric motor are disposed on the line L1 corresponding to a reference rotation angle.

By such intentional relative shift by 10° or −10° between magnetic poles or slots of the first and second electric motors 3A, 3B can shift the phases of pulsation of output torque of these electric motors from each other so that a trough part of cogging which occurs in the second electric motor 3B, is positioned at a crest part of cogging which occurs in the first electric motor 3A. This can cancel cogging.

Figure 10:
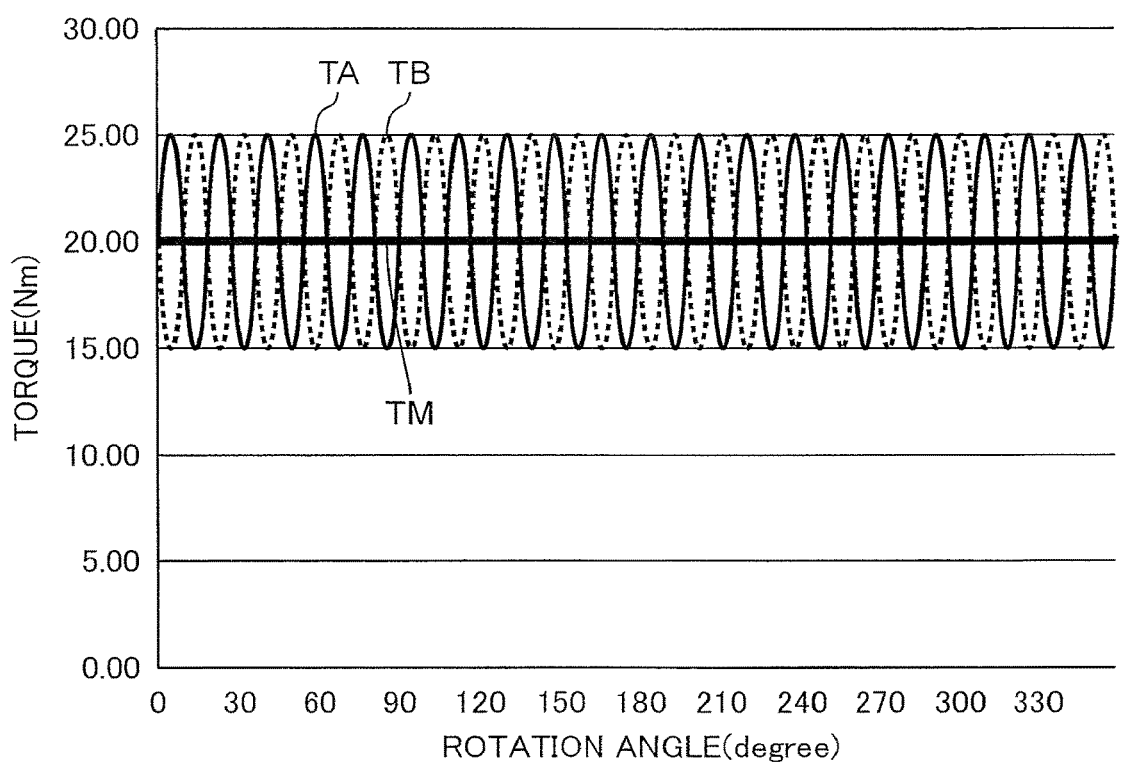
FIG. 10 is a graph showing output torque of the respective electric motors and synthetic torque of a case where two electric motors are connected with each other.
Figure 11:
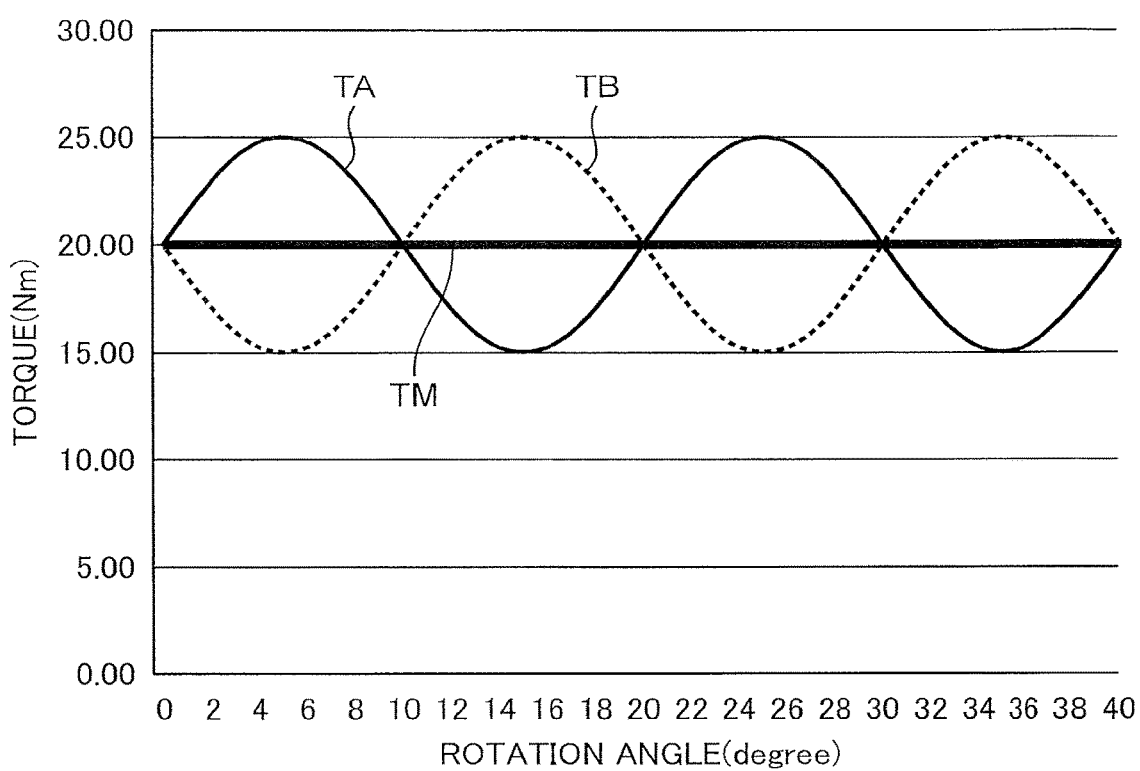
FIG. 11 is a graph in which a part of FIG. 10 is enlarged.

FIG. 10 is a graph showing output torque TA, TB of the first and second electric motors 3A, 3B illustrated in FIG. 8 and synthetic torque TM thereof, and FIG. 11 is a graph in which a part of FIG. 10 is enlarged. Output torque TA of the first electric motor 3A pulsates sinusoidally at a rotation angle of a cycle of 20°. This is influenced by cogging. Output torque TB of the second electric motor 3B similarly pulsates sinusoidally at a rotation angle of a cycle of 20°. However, by shifting the rotors R1B, R2B by a rotation angle=10° as described above in attaching the drive shaft 4, the phase of pulsation of the output torque TB is delayed by 10° with respect to the output torque TA.

When the output torque TA and the output torque TB are superimposed at the drive shaft 4 with a form of a crest part of the output torque TA and a trough part of the output torque TB or with an opposite form, pulsation of these output torque TA, TB is cancelled with each other. Accordingly, synthetic torque TM thereof becomes torque without pulsation, that is, flat torque in which influence of cogging is substantially eliminated. It is to be noted that synthetic torque TM in FIGS. 10 and 11 represents synthetic torque of a case of output torque TA=TB=10 Nm. The same effect can be obtained by the first and second electric motors 3A, 3B illustrated in FIG. 9.

It is to be noted that a rotation angle (FIG. 8) at which the rotors R1B, R2B are shifted, or a rotation angle (FIG. 9) at which the stator SB is shifted is not required to be set to ½ of the pulsation cycle (20° here) due to cogging. For example, even in a case where a shift angle is set to approximately 5° or 15°, pulsation of output torque TA, TB can be cancelled to a certain degree and cogging can be reduced.

<Case of Three Electric Motors>

Figure 12:
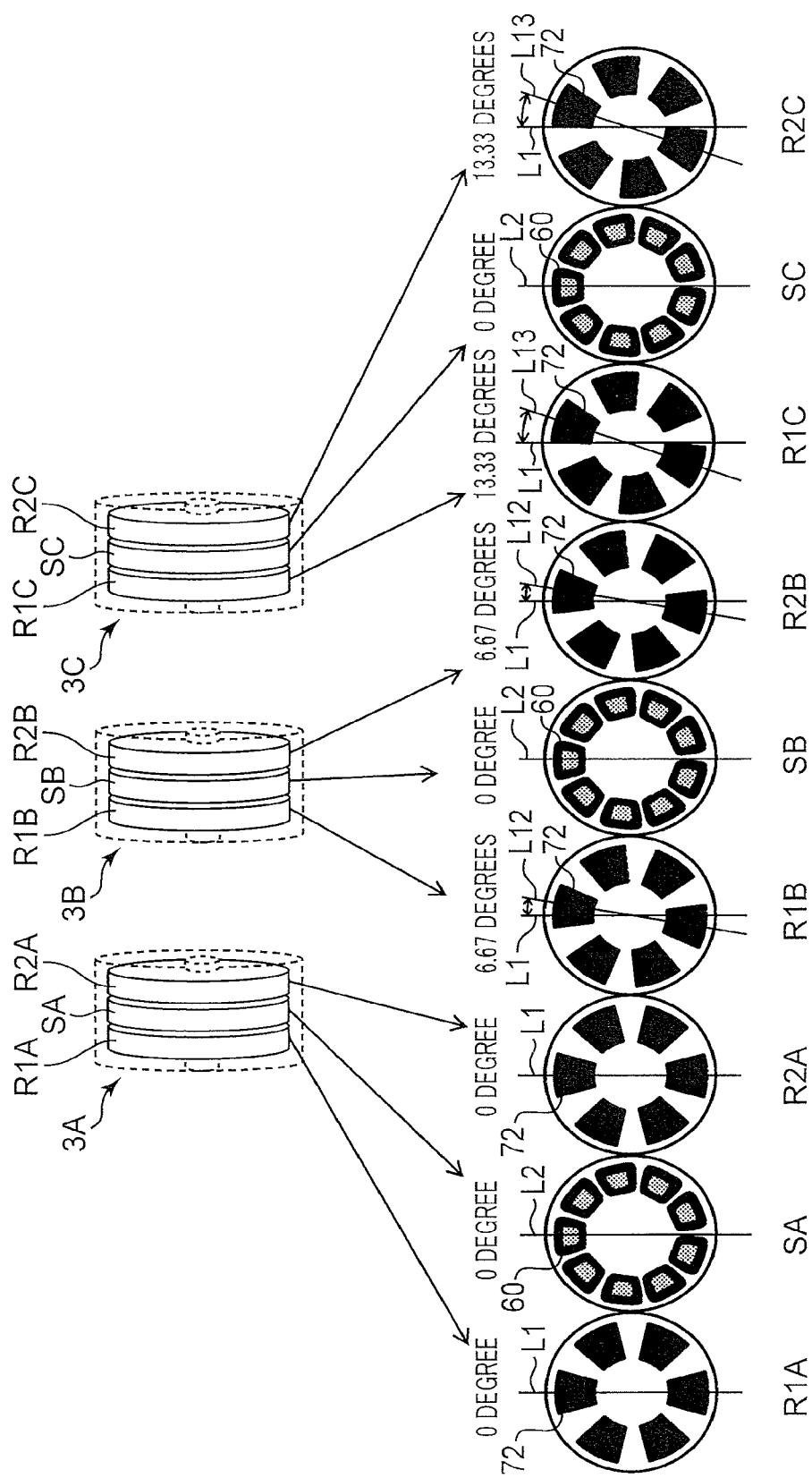
FIG. 12 is a figure illustrating an example of disposition of slots of a stator and magnetic poles of rotors of a case where three electric motors are connected with each other.

FIG. 12 is a figure illustrating another example of the above "Specific Example 1", which is an example of disposition of slots of stators and magnetic poles of rotors of a case where three electric motors 3A, 3B, 3C are connected with each other. All of the first to third electric motors 3A to 3C are axial-gap electric motors of double rotor type in which the first electric motor 3A is provided with a stator SA and two rotors R1A, R2A, the second electric motor 3B is provided with a stator SB and two rotors R2B, and the third electric motor 3C is provided with a stator SC and two rotors R1C, R2C. The number of magnetic poles of the rotors R1A, R2A and the rotors R1B, R2B is six, and the number of slots of the stators SA, SB is nine. Accordingly, the cycle of occurrence of cogging is every rotation angle of a rotor=20° as illustrated in the above description.

The rotors R1A, R2A of the first electric motor 3A are fixed to the drive shaft 4 (FIG. 2) at a reference rotation angle at which permanent magnets 72 are positioned at a predetermined reference position. That is, the circumferential center of one permanent magnet 72 to be a reference is positioned on a line L1 having a rotation angle=0°. The electromagnet units 60 of the stator SA are fixed to a casing of the first electric motor 3A in a manner such that the circumferential center of one electromagnet unit 60 to be a reference is positioned on a line L2 facing the line L1 having the rotation angle=0°.

On the contrary, the rotors R1B, R2B of the second electric motor 3B are fixed to the drive shaft 4 in a manner such that the circumferential center of one permanent magnet 72 to be a reference is positioned on a line L12 shifted by a rotation angle=6.67° in the rotation direction of the rotors R1B, R2B with respect to the line L1. This shift rotation angle=6.67° is a rotation angle obtained by dividing (20°/3) the cogging occurrence cycle (a rotation angle=20°) by the number of electric motors (three). Furthermore, the rotors R1C, R2C of the third electric motor 3C are fixed to the drive shaft 4 in a manner such that the circumferential center of one permanent magnet 72 to be a reference is positioned on a line L13 shifted by a rotation angle=13.33° ((20°/3)×2) in the rotation direction of the rotors R1C, R2C with respect to the line L1. On the other hand, the stators SB, SC are respectively fixed to casings of the second and third electric motors 3B, 3C in a manner such that the circumferential center of one electromagnet unit 60 to be a reference is positioned on the line L2 as with the stator SA.

Figure 13:
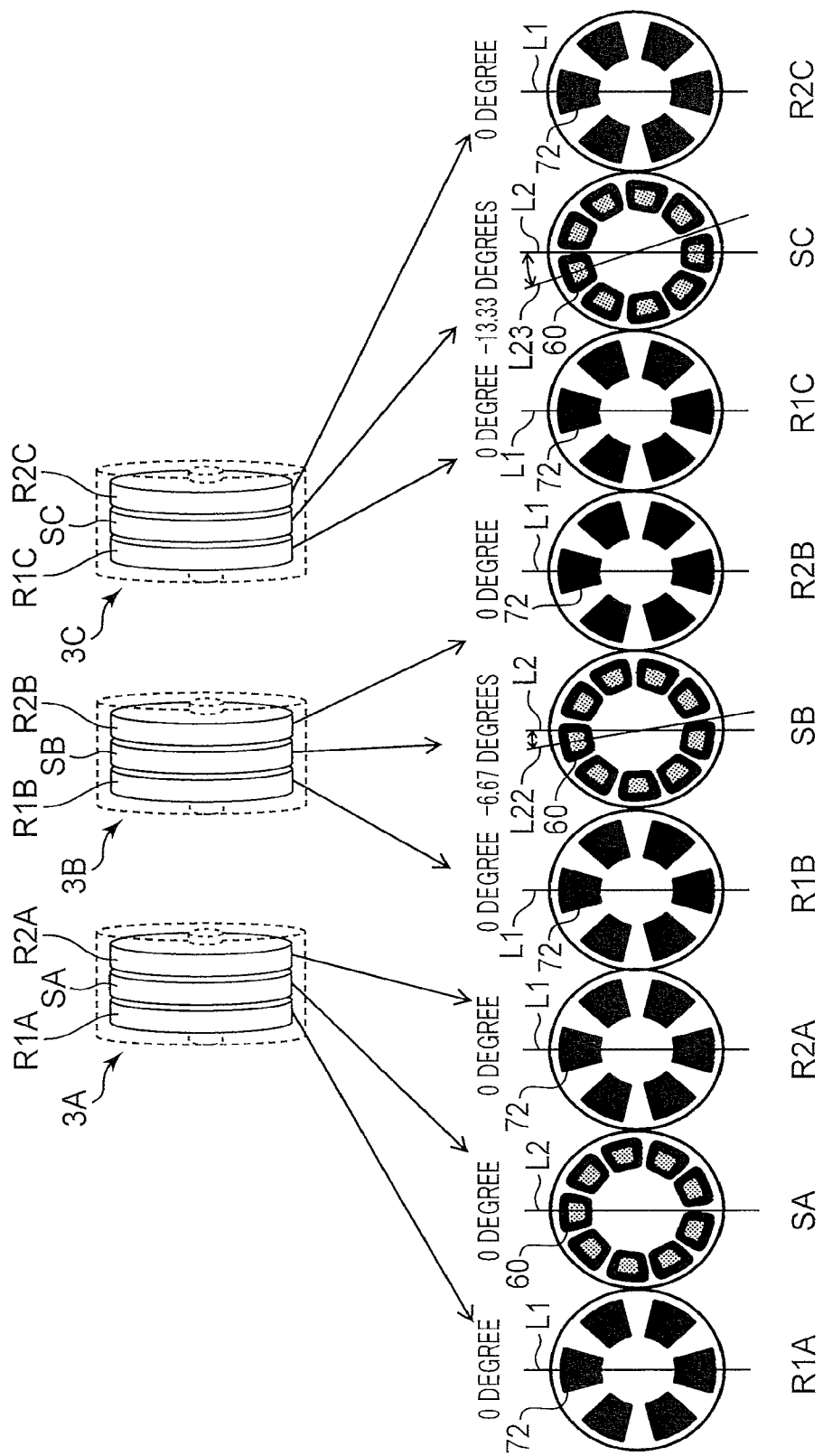
FIG. 13 is a figure illustrating another example of disposition of slots and magnetic poles of a case where the three electric motors are connected with each other.

FIG. 13 is a figure illustrating another example of the above "Specific Example 2", which is an example of disposition of slots of stators and magnetic poles of rotors of a case where three electric motors 3A, 3B, 3C are connected with each other. In this example, regarding the stator SA of the first electric motor 3A, the circumferential center of one electromagnet unit 60 to be a reference is positioned (at a reference slot position) on the above-described line L2. In this state, the stator SA is disposed in the casing of the first electric motor 3A.

On the contrary, regarding the stator SB of the second electric motor 3B, the circumferential center of one electromagnet unit 60 to be a reference is positioned on a line L22 shifted by a rotation angle=−6.67° in the rotation direction of the rotors R1B, R2B with respect to the line L2. In such a shifted state, the stator SB is disposed in the casing of the second electric motor 3B. Furthermore, the stator SC of the third electric motor 3C is fixed to the casing of the second electric motor 3B in a manner such that the circumferential center of one electromagnet unit 60 to be a reference is positioned on a line L23 shifted by a rotation angle=−13.33° in the rotation direction of the rotors R1C, R2C with respect to the line L2. All of the rotors R1A, R2A, R1B, R2B, R1C, R2C of the first to third electric motors 3A to 3C are disposed on the line L1 corresponding to a reference rotation angle.

By such intentional relative shift by 6.67° or −6.67° between magnetic poles or slots of the first to third electric motors 3A to 3C can shift cogging to occur respectively at the first to third electric motors 3A to 3C or, in other words, the phases of pulsation of output torque of these electric motors from each other. This can cancel cogging.

Figure 14:
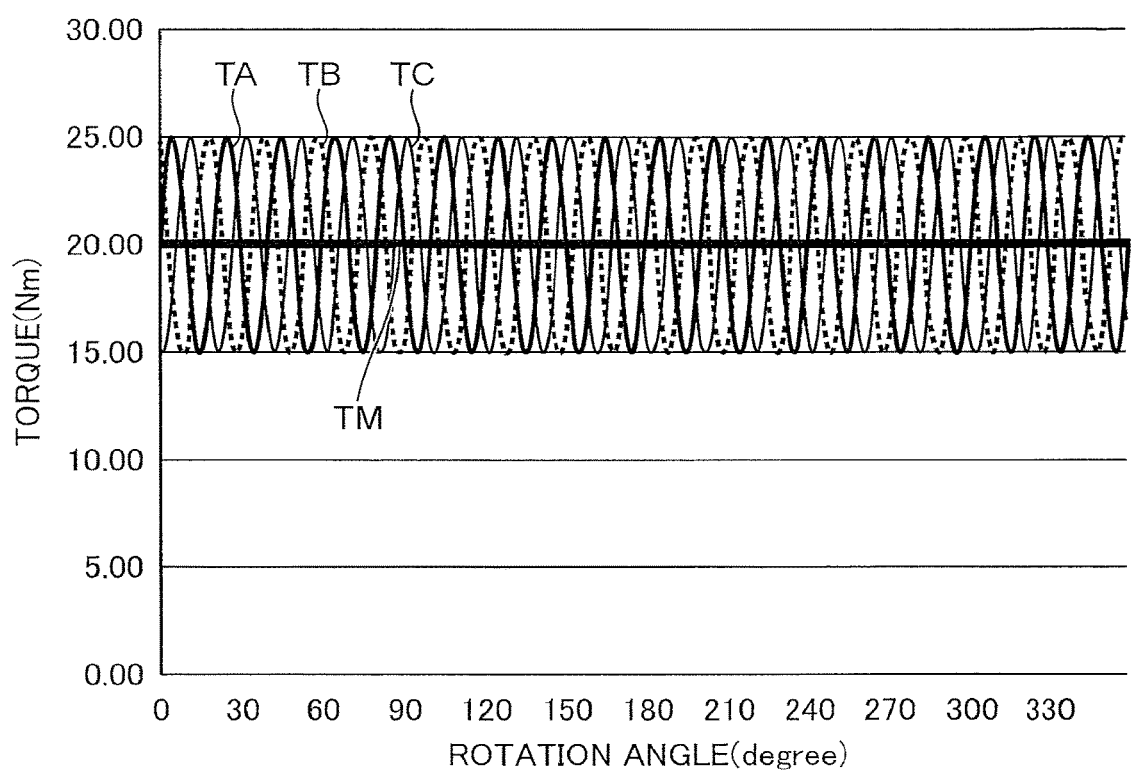
FIG. 14 is a graph showing output torque of the respective electric motors and synthetic torque of a case where three electric motors are connected with each other.
Figure 15:
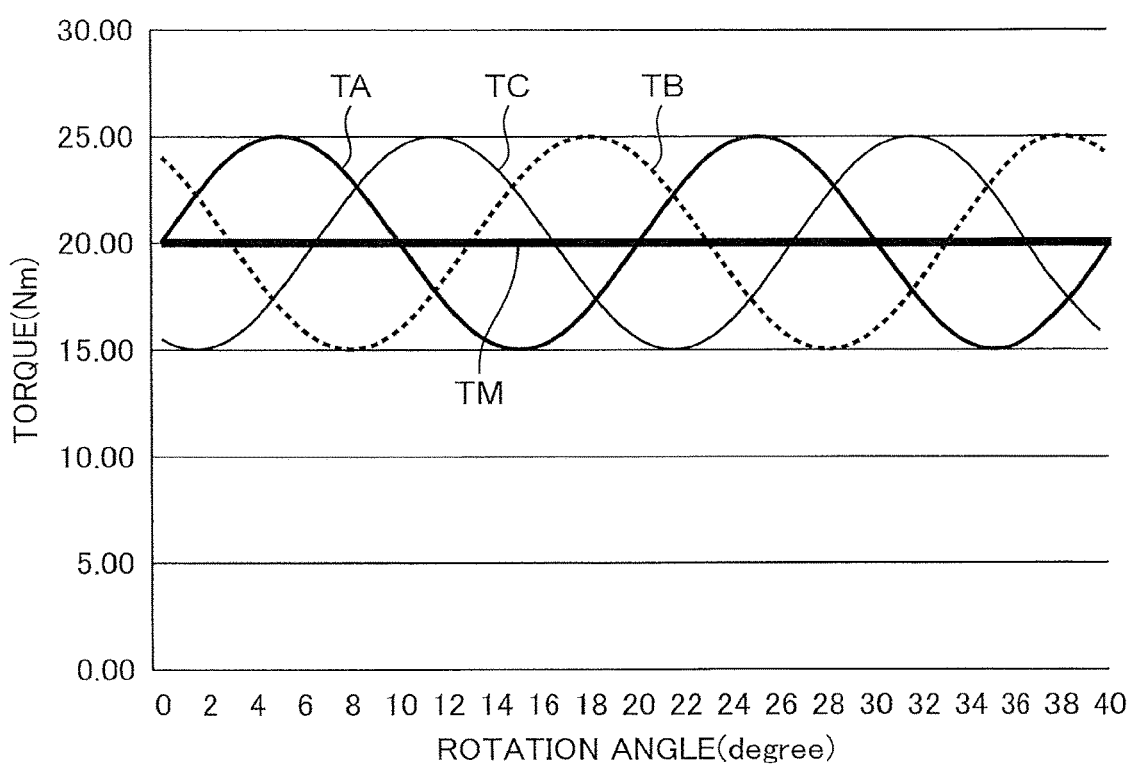
FIG. 15 is a graph in which a part of FIG. 14 is enlarged.

FIG. 14 is a graph showing output torque TA, TB, TC of the first to third electric motors 3A to 3C illustrated in FIG. 12 and synthetic torque TM thereof, and FIG. 15 is a graph in which a part of FIG. 14 is enlarged. Output torque TA of the first electric motor 3A pulsates sinusoidally at a rotation angle of a cycle of 20° by influence of cogging. Output torque TB, TC of the second and third electric motors 3B, 3C similarly pulsates at a rotation angle of a cycle of 20°. However, by shifting the rotors R1B, R2B by a rotation angle=6.67° as described above in attaching the drive shaft 4, the phase of pulsation of the output torque TB of the second electric motor 3B is delayed by 6.67° with respect to the output torque TA. Moreover, by shifting the rotors R1C, R2C by a rotation angle=13.33° as described above in attaching the drive shaft 4, the phase of pulsation of the output torque TC of the third electric motor 3C is delayed by 13.33° with respect to the output torque TA.

As described above, when three output torque TA, TB, TC respectively having phases shifted by 6.67° are superimposed at the drive shaft 4, pulsation of these output torque TA to TC is cancelled with each other. Accordingly, synthetic torque TM thereof becomes torque without pulsation, that is, flat torque in which influence of cogging is substantially eliminated. The same result can be obtained by the first to third electric motors 3A to 3C illustrated in FIG. 13.

As described above, it is possible with the present invention to provide an electrically driven winch device 1 which can suppress the axial width of a winch drum 2 while securing large hoisting capacity. Accordingly, the above electrically driven winch device 1 can be suitably used for a mobile crane 9 having spatial restriction such as vehicle width limitation or limitation on device layout. Moreover, by carrying out the above-described cogging countermeasure, it becomes possible to improve the operability in a case of causing the winch drum 2 to rotate at low speed, a case where inching is performed, or the like.

The present invention is not limited to the above embodiments but can employ various modified embodiments. An electrically driven winch device 1 according to the present invention is not necessarily limited to a winch device for winding up which winds up/down an object. For example, an electrically driven winch device 1 may be a derricking winch device for causing a derricking member such as a boom to derrick. Moreover, a mobile crane 9 according to the present invention is not limited to a crawler crane. For example, the present invention can be similarly applied to a wheel crane having a lower travelling body of wheel type. Furthermore, although FIGS. 8, 12, and others illustrate an example having the number of magnetic poles of a rotor=6 and the number of slots of a stator=9, this is only an example. A combination of the number of magnetic poles=8 and the number of slots=12, a combination of the number of magnetic poles=10 and the number of slots=12, a combination of the number of magnetic poles=16 and the number of slots=18, or the like can be illustrated, for example.

It is to be noted that the above-described specific embodiments mainly include invention having the following structures.

An electrically driven winch device according to an aspect of the present invention includes: a winch drum rotating around a drum axis in order to wind or unwind a work rope; a plurality of axial-gap electric motors which are electric motors configured to drive the winch drum to rotate and are each provided with a stator, and a rotor that rotates around a rotation axis and is disposed at an axial distance from the stator; and a drive shaft being disposed coaxially with the drum axis and serially connects the rotors of the plurality of electric motors on the rotation axis.

With this electrically driven winch device, a plurality of axial-gap electric motors are used as a driving source for a winch drum. In addition, these electric motors are serially connected with each other by a common drive shaft and are assembled in a manner such that the drive shaft is positioned coaxially with the drum axis of the winch drum. An axial-gap electric motor has an advantage that thinning is possible and large torque is obtained in comparison with a radial-gap electric motor. Accordingly, it is possible with the above structure to provide an electrically driven winch device in which a plurality of electric motors are connected with each other so as to obtain large torque while a size of the winch drum in the drum axial direction is suppressed.

In the above electrically driven winch device, the axial-gap electric motor is preferably an electric motor of double rotor type having one stator, and a pair of rotors disposed so as to sandwich the stator in an axial direction.

It is possible with this electrically driven winch device to obtain larger torque in comparison with an electrically driven winch device of single rotor type in which rotors are disposed only on one surface side of the stator.

In the above electrically driven winch device, it is preferable that a stator has a plurality of slots composed of a magnetic core and an exciting coil, the rotor has a plurality of magnetic poles composed of permanent magnets, and each of the electric motors is to cause togging decided by the number of the slots and the number of the magnetic poles and further includes cancelling means configured to cancel cogging which occurs in one electric motor of the plurality of electric motors, and cogging which occurs in another electric motor.

At an electric motor, cogging occurs depending on the number of slots of a stator and the number of magnetic poles of rotors. An axial-gap electric motor can obtain high torque but tends to remarkably cause a problem of cogging. It is possible with the above electrically driven winch device to cancel pulsation of output torque of each electric motor based on cogging by providing the cancelling means. Accordingly, it is possible to improve the operability in a case of causing a winch drum to rotate at low speed, a case where inching is performed, or the like.

In such a case, the cancelling means can be designed to include: a characteristic that a rotor of one electric motor of the plurality of electric motors is fixed to the drive shaft at a reference rotation angle at which the magnetic pole is positioned at a predetermined reference position; and a characteristic that a rotor of another electric motor is fixed to the drive shaft in a state where the magnetic pole is positioned at a position shifted in a rotation direction with respect to the reference rotation angle so that cogging which occurs in the above electric motor, cancels cogging which occurs in the one electric motor.

It is possible with this electrically driven winch device to achieve cancelling of cogging regarding one electric motor and another electric motor by using a simple structure that the magnetic pole positions of rotors of the electric motors are made relatively different in the rotation direction.

Alternatively, the cancelling means can be designed to include: a characteristic that a stator of one electric motor of the plurality of electric motors is disposed in the above electric motor in a state where the slot is positioned at a predetermined reference slot position; and a characteristic that a stator of another electric motor is disposed in the above electric motor with a positional relation that the slot is shifted in the rotation direction with respect to the reference slot position so that cogging which occurs in the above electric motor, cancels cogging which occurs in the one electric motor.

It is possible with this electrically driven winch device to achieve cancelling of cogging regarding one electric motor and another electric motor by using a simple structure that the slot positions of stators of the electric motors are made relatively different in the rotation direction.

It is preferable that the above electrically driven winch device further includes a brake configured to brake the drive shaft.

It is possible with this electrically driven winch device to cause the brake to freely apply braking force to the drive shaft.

It is preferable that the above electrically driven winch device further includes a clutch which switches over between a connected state where torque is transmitted between the drive shaft and the winch drum and a disconnected state where transmission of the torque is broken.

It is preferable with this electrically driven winch device to perform free fall operation of separating the winch drum from the electric motor and causing the winch drum to freely rotate by putting the clutch into the disconnected state.

A mobile crane according to another aspect of the present invention includes: an operation unit for hoisting work; and the above electrically driven winch device, and the work rope is a rope connected with the operation unit.

It is possible with this mobile crane to solve a problem of vehicle width limitation while securing large hoisting capacity by providing the above electrically driven winch device.

As described above, it is possible with the present invention to provide an electrically driven winch device which can suppress the axial width of the winch drum while securing large hoisting capacity, and a mobile crane to which the electrically driven winch device is applied.

The invention claimed is:

1. An electrically driven winch device, comprising:
  a winch drum rotating around a drum axis in order to wind or unwind a work rope;
  a plurality of axial-gap electric motors, which are electric motors configured to drive the winch drum to rotate and are each provided with a stator, and a rotor that rotates around a rotation axis and is disposed to face the stator in an axial direction with an axial gap; and a drive shaft being disposed coaxially with the drum axis and serially connects the rotors of the plurality of electric motors on the rotation axis.

2. The electrically driven winch device according to claim 1, further comprising a brake configured to brake the drive shaft.

3. A mobile crane comprising:

an operation unit for hoisting work; and the electrically driven winch device according to claim 1, wherein the work rope is a rope connected with the operation unit.

4. An electrically driven winch device, comprising:

a winch drum rotating around a drum axis in order to wind or unwind a work rope;

a plurality of axial-gap electric motors, which are electric motors configured to drive the winch drum to rotate and are each provided with a stator, and a rotor that rotates around a rotation axis and is disposed at an axial distance from the stator; and a drive shaft being disposed coaxially with the drum axis and serially connects the rotors of the plurality of electric motors on the rotation axis, wherein the axial-gap electric motor is an electric motor of double rotor type having one stator and a pair of rotors disposed so as to sandwich the stator in an axial direction.

5. A mobile crane comprising:

an operation unit for hoisting work; and the electrically driven winch device according to claim 4, wherein the work rope is a rope connected with the operation unit.

6. An electrically driven winch device, comprising:

a winch drum rotating around a drum axis in order to wind or unwind a work rope;

a plurality of axial-gap electric motors, which are electric motors configured to drive the winch drum to rotate and are each provided with a stator, and a rotor that rotates around a rotation axis and is disposed at an axial distance from the stator; and a drive shaft being disposed coaxially with the drum axis and serially connects the rotors of the plurality of electric motors on the rotation axis, wherein the stator has a plurality of slots composed of a magnetic core and an exciting coil, wherein the rotor has a plurality of magnetic poles composed of permanent magnets, and wherein each of the electric motors is to cause cogging decided by a number of the slots and a number of the magnetic poles, and further comprises a cancelling mechanism configured to cancel cogging that occurs in one electric motor of the plurality of electric motors, and cogging that occurs in another electric motor.

7. The electrically driven winch device according to claim 6, wherein the cancelling mechanism includes:

a characteristic that a rotor of one electric motor of the plurality of electric motors is fixed to the drive shaft at a reference rotation angle at which the magnetic pole is positioned at a predetermined reference position; and a characteristic that a rotor of another electric motor is fixed to the drive shaft in a state where the magnetic pole is positioned at a position shifted in a rotation direction with respect to the reference rotation angle so that cogging which occurs in the another electric motor, cancels cogging which occurs in the one electric motor.

8. The electrically driven winch device according to claim 6, wherein the cancelling mechanism includes:

a characteristic that a stator of one electric motor of the plurality of electric motors is disposed in the one electric motor in a state where the slot is positioned at a predetermined reference slot position; and a characteristic that a stator of another electric motor is disposed in the another electric motor with a positional relation that the slot is shifted in the rotation direction with respect to the reference slot position so that cogging which occurs in said the another electric motor, cancels cogging which occurs in the one electric motor.

9. A mobile crane comprising:

an operation unit for hoisting work; and the electrically driven winch device according to claim 6, wherein the work rope is a rope connected with the operation unit.

10. An electrically driven winch device, comprising:

a winch drum rotating around a drum axis in order to wind or unwind a work rope;

a plurality of axial-gap electric motors, which are electric motors configured to drive the winch drum to rotate and are each provided with a stator, and a rotor that rotates around a rotation axis and is disposed at an axial distance from the stator;

a drive shaft being disposed coaxially with the drum axis and serially connects the rotors of the plurality of electric motors on the rotation axis; and a clutch, which switches over between a connected state where torque is transmitted between the drive shaft and the winch drum and a disconnected state where transmission of the torque is broken.

11. A mobile crane comprising:

an operation unit for hoisting work; and the electrically driven winch device according to claim 10, wherein the work rope is a rope connected with the operation unit.

* * * * *